United States Patent
Wang

(10) Patent No.: US 9,602,218 B2
(45) Date of Patent: Mar. 21, 2017

(54) DIRECTLY MODULATED LASER WITH DISPERSION COMPENSATION

(71) Applicant: ARRIS Enterprises, Inc., Suwanee, GA (US)

(72) Inventor: Jun J. Wang, Warrington, PA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 94 days.

(21) Appl. No.: 14/340,941

(22) Filed: Jul. 25, 2014

(65) Prior Publication Data
US 2016/0028490 A1    Jan. 28, 2016

(51) Int. Cl.
H04B 10/04 (2006.01)
H04B 10/00 (2013.01)
H04B 10/58 (2013.01)
H04B 10/2513 (2013.01)
H04B 10/2575 (2013.01)
H04B 10/516 (2013.01)
H04B 10/564 (2013.01)
H04B 10/50 (2013.01)

(52) U.S. Cl.
CPC ....... H04B 10/58 (2013.01); H04B 10/25137 (2013.01); H04B 10/25751 (2013.01); H04B 10/503 (2013.01); H04B 10/516 (2013.01); H04B 10/504 (2013.01); H04B 10/564 (2013.01)

(58) Field of Classification Search
None
See application file for complete search history.

(56) References Cited

U.S. PATENT DOCUMENTS 5,115,440 A * 5/1992 Gysel ............... H04B 10/25137
372/26
5,267,071 A * 11/1993 Little ................. H03G 3/3084
250/214 A (Continued)

FOREIGN PATENT DOCUMENTS

EP        2124360 A2    11/2009

OTHER PUBLICATIONS

Carr, Joseph J., Microwave & Wireless Communicaitons Technoligy, 1996, Butterworth-Heinemann, p. 146-147.*

(Continued)

*Primary Examiner* — Ken N Vanderpuye
*Assistant Examiner* — Jai Lee
(74) *Attorney, Agent, or Firm* — Lori Anne D. Swanson

(57) ABSTRACT

Systems and methods for using a dispersion compensation circuit to directly modulate a laser. Techniques include calibrating a varactor bias point in a dispersion compensation circuit during manufacturing, but positioning the dispersion compensation circuit between a first attenuator and a second attenuator. Each attenuator, capable of reducing power of an input signal, may be adjustable so that the attenuation provided by each attenuator may be adjusted. The ratio of attenuation between attenuators may be adjusted based on either chirp of a laser or fiber length, and a varactor bias point may be adjusted by the other one of the chirp of the laser or fiber length. Thus, both chirp and fiber length may serve as a basis for adjusting attenuation between attenuators having a dispersion compensation circuit positioned between them.

20 Claims, 3 Drawing Sheets

(56) References Cited

U.S. PATENT DOCUMENTS

| | | | | |
|---|---|---|---|---|
| 5,430,569 A * | 7/1995 | Blauvelt | H04B 10/2507 | 372/26 |
| 5,548,603 A * | 8/1996 | Calvani | H01S 5/0014 | 372/20 |
| 5,798,854 A * | 8/1998 | Blauvelt | H03F 1/3252 | 327/362 |
| 6,122,302 A * | 9/2000 | Dean | H01S 5/0683 | 372/26 |
| 6,813,448 B1 * | 11/2004 | Chiappetta | H04B 10/2537 | 398/147 |
| 7,792,165 B2 * | 9/2010 | Khalouf | H04B 10/6972 | 372/38.02 |
| 7,809,282 B2 * | 10/2010 | Zhou | H04B 10/25137 | 372/38.08 |
| 2007/0264027 A1 | 11/2007 | Zhou | | |
| 2009/0245309 A1 | 10/2009 | Khalouf et al. | | |

OTHER PUBLICATIONS

Du et al., Wireless Communication Systems: From RF Subsystems to 4G Enabling Technoligies, 2010, Cambridge University Press, p. 424.*

Bakshi et al., Networks and Lines, 2008, Technical Publications Pune, p. 33.*

Bao, Yuan, et al., "Nonlinearity mitigation for high-speed optical OFDM transmitters using digital pre-distortion", Optical Society of America, Optics Express 7354, vol. 21, No. 6, Mar. 25, 2013.

Sankaralingam, R., "Electroabsorption Modulators", Oakland University, EE 698, Fall 2009.

"Varicap", as defined by Wikipedia.com, http://en.wikipedia.org/wiki/varicap, as downloaded on Mar. 27, 2014.

PCT Search Report & Written Opinion, RE: Application No. PCT/US2015/037724; dated Sep. 22, 2015.

* cited by examiner

DIRECTLY MODULATED LASER WITH DISPERSION COMPENSATION

CROSS-REFERENCE TO RELATED APPLICATION

None

BACKGROUND OF THE INVENTION

The subject matter of this application relates to systems and methods that provide optical signals over a cable transmission network.

Early CATV systems were configured to deliver content along a coaxial transmission path from a content provider to its subscribers. As these systems evolved to not only provide a greater amount of content, but to provide data services that travel to and from the subscriber (e.g. Internet service), much of the coaxial path from the provider to the subscribers was replaced with fiber-optic cable, which could transmit a signal over a greater distance with less intermediate amplification. Initially, 1310 nm fiber-optics were deployed, but as CATV systems continue to evolve, much of the 1310 nm infrastructure is being upgraded with 1550 nm fiber optic infrastructure, as the 1550 nm wavelength reduces attenuation losses along the length of the cable, and allows the use of wavelength division multiplexing (WDM) to simultaneously transmit both analog and digital signals.

Due to the combination of laser chirp with fiber dispersion, a directly modulated laser operated in the 1550 nm wavelength tends to produce a great deal of distortion in the CATV transmission system. Therefore, indirectly modulated lasers have been used to emit a signal onto 1550 nm fiber optic cable. Generally speaking, there are two known approaches to dispersion compensation, one being optical dispersion compensation and the other being electronic dispersion compensation. Optical dispersion technologies are expensive, prone to optical losses, and can often incur some undesired signal degradations, such as filter band limitation and optical non-linearities. Electronic dispersion technology on the other hand is less expensive relative to optical modulation approaches, but has disadvantages such as its limitation in dispersion compensation, which limits the number of analog channels to be transmitted and transmission distance. Therefore, improvement in the dispersion compensation capability is needed.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
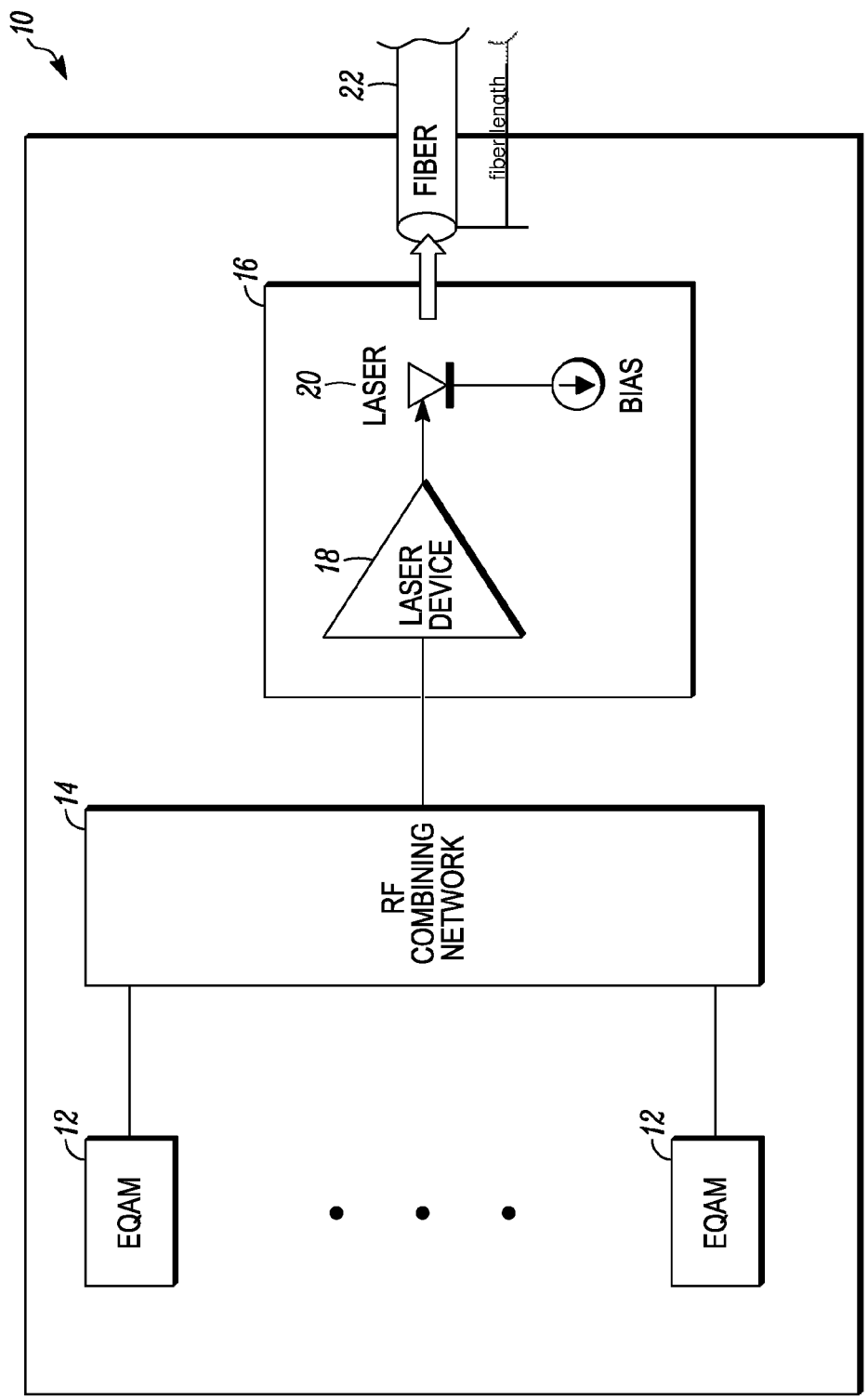
FIG. 1 shows an example of a directly modulated laser in a head end of a CATV transmission system.

As previously noted, demand for bandwidth in hybrid-fiber coaxial (HFC) CATV networks is continually growing to support applications such as IP data, high definition TV and video on demand. To meet this demand, HFC networks are being upgraded to provide 1550 nm transmission and wavelength division multiplexing (WDM) rather than providing more cable, since the latter is cost-prohibitive. Also, as noted above, modulating a laser to transmit signals at that wavelength is typically accomplished using indirect or external modulation methods. Two typical types of external modulators are Mach-Zehnder modulators and electro-absorption modulators (EAMs). A Mach-Zehnder modulator receives an incoming optical signal and splits it equally, sending the split signals down two respectively different optical paths. After a certain distance, the two paths recombine, causing the optical waves to interfere with each other. Such an arrangement is known as an interferometer. The phase shift between the two optical signals is controlled by changing the delay through one or both of the optical paths by means of the electro-optic effect. If the phase shift between the two waves is 0° then the interference is constructive and the light intensity at the output is high (on state); if the phase shift is 180° then the interference is destructive and the light intensity is zero (off state). Mach-Zehnder modulation, however, is typically expensive.

An EAM consists of an active semiconductor region sandwiched in between a p- and n-doped layer, forming a p-n junction. The EAM works on the principle known as Franz-Keldysh effect, according to which the effective bandgap of a semiconductor decreases with increasing electric field. Without bias voltage across the p-n junction, the bandgap of the active region is just wide enough to be transparent at the wavelength of the laser light. However, when a sufficiently large reverse bias is applied across the p-n junction, the effective bandgap is reduced to the point where the active region begins to absorb the laser light and thus becomes opaque. Thus, an EAM may be effectively used to selectively pass or absorb light emitted by a laser depending on the voltage applied across the p-n junction of the EAM Because the electric field in the active region not only modulates the absorption characteristics, but also the refractive index, the EAM produces some chirp. However, this chirp usually is much less than that of a directly-modulated laser. Moreover, because an EAM is small, it can be integrated on the same chip as the laser itself, leading to substantial economies of production and low coupling losses between the laser and the EAM. The combination of a laser with an EAM is typically referred to as an Electro-Absorption Modulated Laser (EML).

Though EMLs offer easy integration, low driving voltage and power dissipation, the modulator inherently introduces nonlinear distortions (second order and higher) in the modulated optical signal which results in bit error rate (BER) performance degradation. These distortions vary strongly as a function of the bias point of the EAM, and therefore the precise point where distortions are minimized is set differently for different lasers. Though some pre-distortion techniques can be used to further correct for residual laser distortion that occurs even after selection of an optimal bias point, such approaches are often costly due to the difficulty in precisely setting the bias to an optimal point and holding the bias to that point. Furthermore, while less expensive than Mach-Zehnder modulators, EMLs are still more expensive than a Distributed Feedback (DFB) modulated laser.

A DFB-based directly modulated transmitter is known to be one of the cheapest technologies to modulate light, but as indicated previously, directly modulated lasers tend to produce high levels of second order distortion in the fiber due to interaction between laser chirp and dispersion of the optical signal in the fiber. Laser chirp occurs as a laser's current is changed to provide the signal being propagated; the laser's carrier density changes and therefore results in a time-dependent phase change, where variations in a signal output from a laser is accompanied by modulations in frequency. Dispersion (the spatial distortion of an optical signal traveling over a fiber-optic cable) can be either modal dispersion, chromatic dispersion, or polarization mode dispersion. Modal dispersion results from the different speeds at which light travels through different fiber modes, and can be eliminated by using single mode fiber. Chromatic dispersion refers to the different traveling time for different wavelengths in the fiber, due to the differing propagation speeds at the respective wavelengths. Though some lasers can emit light in very narrow spectral bands, no laser can emit light at a single, monochromatic wavelength, hence chromatic dispersion will always occur. Polarization mode dispersion results from the difference in propagation constants of a fiber optic cable due to imperfections in its geometry. Dispersion is particularly limiting when seeking to expand CATV content delivered over a fiber optic cable using techniques such as wavelength division multiplexing (WDM).

FIG. 1 generally illustrates a system that uses a directly modulated laser configured to mitigate the second order distortion caused by the combination of laser chirp with optical dispersion. FIG. 1 shows a head end 10 having a plurality of EdgeQAM (EQAM) units 12 that receive signals representing content provided by a CATV operator, e.g. a plurality of cable channels, and modulate those channels using quadrature-amplitude modulation. The signals from the EQAM units 12 may preferably be combined (multiplexed) in an RF combining network 14, which delivers the signal to a transmitter 16 comprising a directly modulated laser. The transmitter 16 may include a laser driver 18 that drives a laser 20. The laser 20 then propagates the modulated signal onto a fiber optic cable 22. The laser driver 18 is preferably capable of driving lasers 20 of any appropriate wavelength, e.g. 1310 nm, 1550 nm, etc. It should also be understood that the EQAM units 12 are capable of modulating both analog and digital signals, and that the EQAM architecture depicted is illustrative only, as substitute architectures (e.g., Converged Cable Access Platform architectures) may be readily used.

Those of ordinary skill in the art will appreciate that the system 10 is used to generally illustrate but one functional use of the disclosed directly modulated laser, and that other uses can easily be envisioned. For example, the disclosed directly modulated laser may be used in a node that transmits return path signals to a head end. More broadly, the disclosed directly modulated laser may be used in any application that transmits a modulated optical signal onto a fiber optic cable that traverses great distances for which dispersion would ordinarily be a problem. Those of ordinary skill in the art will also realize that the laser 20 includes the requisite pumps, mirrors, etc. in addition to the laser diode depicted, and may also include filtering components, such as resistors, capacitors, or inductors between the laser driver and the laser diode shown in FIG. 1

Figure 2:
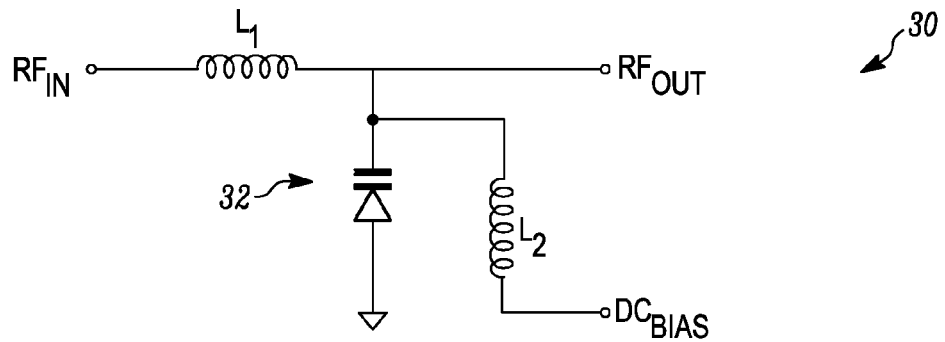
FIG. 2 shows one embodiment of a dispersion compensation circuit including a varactor.
Figure 3:
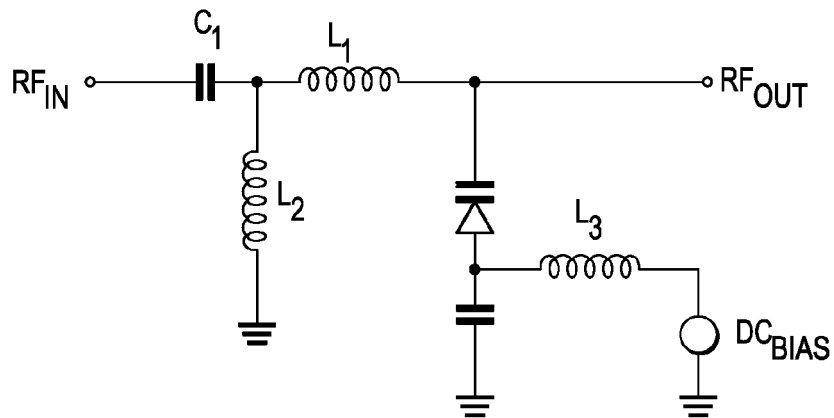
FIG. 3 shows a second embodiment of a dispersion compensation circuit including a varactor.
Figure 4:
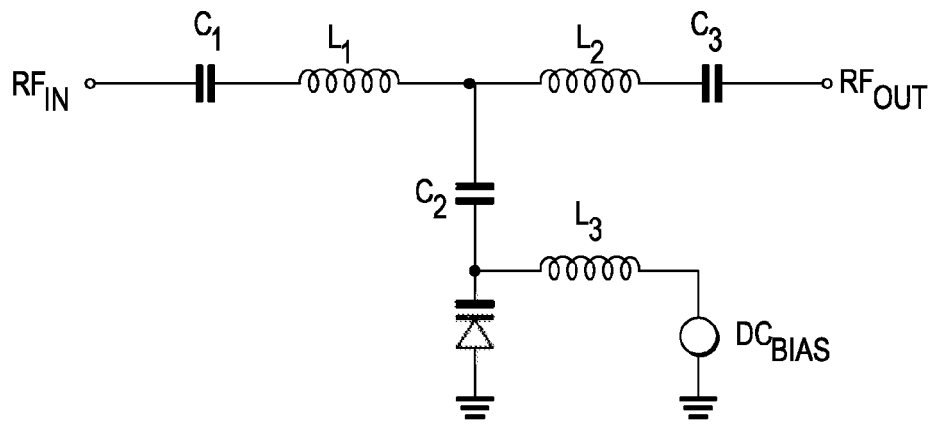
FIG. 4 shows a third embodiment of a dispersion compensation circuit including a varactor.

The laser driver 18, which includes a dispersion correction circuit, preferably modulates the laser 20. FIG. 2, for example, illustrates a dispersion correction circuit 30 having one varactor 32. In the circuit 30, the inductor (L1) and the varactor 32 make a low pass filter. The inductor L2 is used to provide DC bias for the varactor circuit and AC (RF) signal block. The RF input signal changes the capacitance of the varactor diode and therefore the delay time of the low pass filter circuit. The changing delay time provides the dispersion compensation. Although FIG. 2 shows one type of varactor circuit, many other types are known to those of skill in the art. For example, FIGS. 3 and 4 illustrate two of many alternate types of varactor circuits.

The composite second order distortion (CSO) caused by the interaction of laser chirp and fiber dispersion due to modulation with a varactor circuit can be expressed as $$CSO = N_{cso} * (w_1 + w_2)^2 I_0^2 * (\lambda^2/c)^2 (DL(dv/dI))^2 \quad (1)$$

Where $N_{CSO}$ is the number of beats, $w_1$ and $w_2$ are two modulation carrier frequencies, $I_0$ is the modulation signal amplitude, $\lambda$ is the light wavelength, c is the speed of light, D is the fiber dispersion, L is the fiber length, and dv/dI is the laser chirp.

As seen from the equation (1), CSO is proportional to $(dv/dI)^2$ and therefore lasers of different chirp levels require different levels of dispersion compensation. Likewise, CSO is proportional to $L^2$ and thus different fiber lengths require different levels of dispersion compensation. Laser chirp and fiber length play a similar role in CSO generation.

For DFB lasers, chirp can range widely, even where the design of separate lasers is the same. For example, among the same laser batch, the high chirp value can be twice as large as the low chirp value. This is because of process control accuracy, tolerance and imperfection.

In general, tuning of dispersion compensation is accomplished by changing the varactor bias voltage to operate the varactor at a desired C-V slope. Specifically, a smaller amount of dispersion compensation requires a smaller C-V slope, while, a larger amount of dispersion compensation requires a large C-V slope. Large laser chirp distribution and large range of fiber length require a wide dispersion compensation tuning. However from the circuit design point of view, if the tuning range is too large, the impedance variation of the dispersion compensation circuit can also vary significantly as shown in the equation (2) for the circuit in FIG. 2

$$Z = \sqrt{\frac{L_1}{C_v}} \quad (2)$$

where Z is the impedance of low pass filter comprising the varactor capacitance, $C_v$, and inductor $L_1$.

The capacitance of a varactor at any voltage can be expressed as $$C(v) = C_{j0}(1 - V/V_{bi})^{-\gamma} = C_{j1}(V_{bi} - V)^{-\gamma} \text{ and} \quad (3)$$

$$C_{j1} = C_{j0}(V_{bi})^{-\gamma} \quad (4)$$

where C(v) is the varactor capacity at the instant voltage v, $C_{j0}$ is the varactor capacity at zero voltage, and γ is a parameter depending on the varactor doping profile. For example, γ=0.5 for an abrupt junction, and γ=1.0 for a hyper-abrupt junction.

The chirp-dispersion caused delay may be expressed as $$\Delta \tau = -\frac{1}{C} \lambda_0^2 Dl \frac{dv}{dI} I_0 [\sin(w_1 t + \varphi_1) + \sin(w_2 t + \varphi_2)] \quad (5)$$

where D is the fiber dispersion, l is the fiber length and C is the speed of light. Equation (5) suggests that the chirp-dispersion caused delay Δτ is proportional to the both fiber length L and laser chirp dv/dl.

The modulation of the laser driver by the delay-compensating network in the circuit of FIG. 2 produces a group signal delay, which may be expressed as $$T_{gd} = (L_1 C(v))^{1/2}. \quad (6)$$

Taking the derivative of equation (5) produces the equation:

$$\delta T_{gd} = \frac{1}{2}\left(\frac{L_1}{C(v)}\right)^{1/2} \delta C \quad (7)$$

Equation (6) expresses signal dependent delay because it depends on the capacitance of the circuit, which changes as a function of the driving voltage. Assuming the C-V curve is linear for a small signal and its slope at the bias voltage $v_b$ is $S(v_b)$, then $$\delta C = s(v_b) I_0 [\sin(w_1 t + \phi_1) + \sin(w_2 t + \phi_2)] \quad (8)$$

Where $I_0[\sin(w_1 t + \phi_1) + \sin(w_2 t + \phi_2)]$ is the modulating signal current assuming two-carrier modulation.

The present inventor realized that the composite second order distortion produced by directly modulating a laser could be controlled by modulating the driving signal such that the signal-dependent group delay cancels the chirp-dispersion delay. Stated differently, dispersion compensation may be achieved by modulating the laser such that the following relationship is satisfied:

$$\delta T_{gd} + \Delta \tau = 0 \quad (9)$$

It is seen from equation (7) that $\delta T_{gd}$ (which is proportional to $\delta C$) can be tuned by either changing the C-V slope $s(v_b)$ or the modulation signal amplitude $I_0$, as suggested by equation (8). C-V slope $s(v_b)$ is set by the varactor bias $v_b$.

As mentioned earlier, a dispersion compensation circuit must compensate for dispersion resulting from both laser chirp distribution and fiber length. Dispersion compensation is primarily achieved by finding an optimal setting for the varactor bias to minimize dispersion, but such an approach makes manufacturing of a dispersion compensation circuit difficult given the large and unpredictable variations in chirp distributions of different lasers, as well as large differences in fiber length, or both. Also, tuning a dispersion compensation circuit by merely setting the varactor bias may change the circuit impedance, and may thus make dispersion compensation calibration problematic during transmitter production, as well as lead to some undesired performance degradation.

Figure 5:
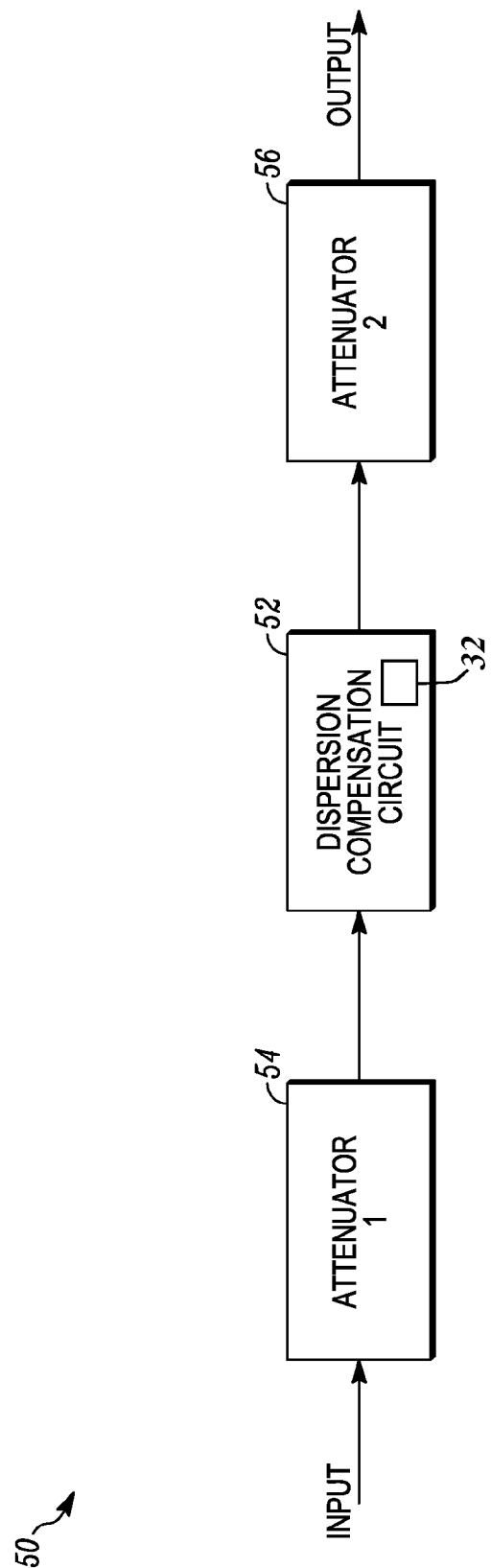
FIG. 5 shows a dispersion compensation circuit that is tuned using a plurality of attenuators.

FIG. 5 shows an arrangement that permits dispersion compensation circuits to be manufactured such that each has a varactor calibrated to the same reference bias voltage as other manufactured circuits, and where the arrangement can be easily tuned to compensate for a wide variety of laser chirp/fiber length combinations. Specifically, FIG. 5 shows a dispersion compensation circuit 52 that may be positioned between a first RF attenuator 54 and a second RF attenuator 56. The dispersion compensation circuit may in one embodiment comprise the circuit shown in FIG. 2, but other embodiments may use other dispersion compensation circuits, such as but not limited to the circuits shown in FIGS. 3 and 4. Each of the RF attenuators 54 and 56 are preferably characterized in that they reduce the power of the input signal without appreciably distorting the frequency characteristics of the waveform of the incoming signal. Each of the attenuator 54 and attenuator 56 may preferably be constructed of purely passive elements such as resistors without complex impedances (or more broadly may in different embodiments be preferably be constructed of any combination of elements driven in proportion to voltage and/or current, including but not limited to those elements with complex impedances such as capacitors and inductors) and can be, for example, T-type attenuator circuits (whether balanced or unbalanced), π-type attenuator circuits (whether balanced or unbalanced), or any other appropriate attenuator circuit. In some embodiments one or more of the RF attenuators 54 and 56 may be adjustable so that the attenuation provided by each attenuator may be adjusted. For example, the RF attenuators and 56 may include potentiometers, or may include switches that selectively add or subtract resistances in stepped amounts.

In operation, the RF signal from the RF combining network may be input to the RF attenuator 54, which attenuates the signal and inputs the attenuated signal to the dispersion compensation circuit 52. The output of the dispersion compensation circuit is then attenuated by the attenuator 56, and once attenuated is used to drive the laser 20 of FIG. 1.

The total attenuation of the laser driving signal is $$L = L_1 + L_2 \quad (10)$$

where L is the total attenuation, $L_1$ is the attenuation of the attenuator 54 and $L_2$ is the attenuation of attenuator 56. Though equation (10) has two variables $L_1$ and $L_2$, these variables are preferably related to each other by a fixed total attenuation L. Thus, where there are two sources of delay, or composite second order distortion, produced by directly modulating a laser, i.e. laser chirp and fiber length, the arrangement of FIG. 5 permits two independent tuning mechanisms so that distortion from laser chirp and distortion from fiber length may be mitigated independently. For example, one approach to minimizing composite second order distortion would be to use the chirp of a laser as basis for selecting the ratio of $L_1$ to $L_2$ (given the fixed total attenuation L) and to use the fiber length as a basis for selecting the varactor bias point. A second approach would reverse this process to use the fiber length as basis for selecting the ratio of $L_1$ to $L_2$ (given the fixed total attenuation L) and to use the chirp of a laser as a basis for selecting the varactor bias point.

More specifically, the arrangement of FIG. 5 permits dispersion compensation circuits to be manufactured according to a reference specification that corrects for a reference system with a laser of a known chirp $dv/dl_0$ and a known fiber length $l_0$. The reference specification establishes a fixed total attenuation L, and calibrates the varactor bias $V_b$ and the ratio of $L_1$ to $L_2$ at the time of manufacture to specific values that together minimize the second order distortion for the reference system values $dv/dl_0$ and $l_0$. When the manufactured dispersion compensation circuit is used with lasers of different chirps and/or different fiber lengths, the reference values $dv/dl_0$ and $l_0$ may be individually used as a basis for independently adjusting the varactor bias and the attenuation ratio $L_1/L_2$.

For example, assuming that the dispersion compensation circuit is applied in a system with a laser A having more chirp than the chirp $dv/dl_0$ of the reference laser but a fiber length less than that of the reference length $l_0$, then in a first embodiment $L_2$ may be increased by $\Delta L$ and $L_1$ may be decreased by $\Delta L$. $\Delta L$ may preferably be approximately 6 dB for every doubling of chirp with respect to the chirp of the reference laser, to make the input signal current $I_0$ twice as large to compensate for the doubling of chirp. The varactor bias may accordingly be increased (inversely biased) from the reference voltage to compensate for the lower fiber length. In a second embodiment, the procedure can be reversed and the varactor bias may be increased to adjust for the higher laser chirp while the ratio of $L_2/L_1$ may be decreased based on fiber length.

By attenuating the driving signal of a laser in steps, such that part of the attenuation occurs prior to the dispersion compensation circuit and the other part of the attenuation occurs after the dispersion compensation circuit, the varactor bias of the dispersion compensation circuit can now be set to the same operating point at the time of manufacture, and thereby achieve economies of scale because dispersion compensation circuits can be fabricated that have a wider range of application to a variety of lasers and a variety of fiber lengths using the tuning techniques disclosed by the present application. In other words, the devices and methods disclosed in the present application allows the same circuit to compensate for the dispersion of lasers with different chirps for a given fiber length, and can compensate for different fiber lengths even with the lasers of the same chirp.

The foregoing description uses the circuit in FIG. 5 as an example and all the calculations also are made using that circuit. However the example only serves the explanative purpose. Therefore the method proposed here is not limited to the case as demonstrated in the example. It should also be understood that although the dispersion compensation circuits illustrated in the present disclosure have only a single varactor, other dispersion compensation circuits may have multiple varactors that may be tuned in accordance with the present disclosure. Furthermore, those of ordinary skill in the art will recognize that some embodiments may employ a dispersion compensation circuit manufactured together with the disclosed attenuators, while other embodiments may simply manufacture the dispersion compensation circuit and permit system operators to configure the circuit with attenuators according to the present disclosure.

It will be appreciated that the invention is not restricted to the particular embodiments that have been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A laser driver for driving a laser transmitter, said laser driver comprising:
   (a) a dispersion compensation circuit having at least one varactor, where said dispersion compensation circuit changes a delay characteristic based on a driving signal for said circuit; and
   (b) a first attenuator at an input of said compensation circuit and a second attenuator at an output of said compensation circuit,
   wherein the attenuators are simultaneously adjustable over a range of fiber lengths or a range of laser chirp distribution to maintain a fixed total attenuation between the first and second attenuators while changing a driving voltage to the at least one varactor during adjustments.

2. The laser driver of claim 1 where at least one of said first attenuator and said second attenuator are variably adjusted attenuator circuits.

3. The laser driver of claim 1 where both the first attenuator and the second attenuator are adjustable to maintain a fixed total amount of attenuation.

4. The laser driver of claim 1 where each said at least one varactor has a bias that is tuned based on the amount of chirp of a laser to be modulated by said laser driver.

5. The laser driver of claim 1 where each said at least one varactor has a bias that is tuned based on the length of fiber to propagate a signal carried on modulated light.

6. The laser driver of claim 1 where each of said first attenuator and said second attenuator attenuates the power of an input signal without substantially changing the waveform of said input signal.

7. A method for tuning a laser driver that directly modulates a laser, said laser driver having a dispersion compensation circuit having at least one varactor, said method comprising:
   (a) attenuating an input to said compensation circuit; and
   (b) attenuating an output of said compensation circuit,
   wherein an attenuation provided to both the input and output of said compensation circuit is simultaneously adjustable over a range of fiber lengths or a range of laser chirp distribution to maintain a fixed total attenuation while changing a driving voltage to the at least one varactor of the compensation circuit during such adjustments.

8. The method of claim 7 where a bias point of the at least one varactor is selected based on the length of fiber that propagates a signal carried on modulated light.

9. The method of claim 8 where the ratio of the attenuation at the input of said compensation circuit to the attenuation at the output of said compensation circuit is based upon the amount of chirp of a laser transmitting the signal carried on modulated light.

10. The method of claim 7 where the total amount of attenuation is fixed while an input power to the compensation circuit varies based upon the amount of chirp of a laser transmitting the signal modulated by said laser driver and a laser modulation index.

11. The method of claim 10 where the ratio of the attenuation at the input of said compensation circuit to the attenuation at the output of said compensation circuit is based upon the length of fiber that propagates a signal carried on modulated light.

12. The method of claim 7 where each said at least one varactor has a bias that is tuned based on the amount of chirp of a laser to be modulated by said laser driver.

13. The modulator of claim 7 where each said at least one varactor has bias that is tuned based on the length of fiber to propagate a signal carried on modulated light.

14. The modulator of claim 1 where each of said compensation circuit is attenuated without substantially changing the waveform of a signal modulated by said laser driver.

15. A method for manufacturing a dispersion compensation circuit, said method comprising:
   (a) providing a varactor operated with a bias; and
   (b) providing a filter at the input of said dispersion compensation circuit, said filter modifying a frequency characteristic of a waveform of a signal input to said dispersion compensation circuit,
   where the dispersion compensation circuit is configured for coupling to a first attenuator at an input of said compensation circuit and a second attenuator at an output of said compensation circuit for changing a driving voltage to the varactor while maintaining a fixed total attenuation between the first and second attenuators, a bias point of the varactor set during manufacture to accommodate a range of chirp characteristics of a laser driver or a range of fiber lengths to propagate a signal.

16. The method of claim 15 where the bias of the varactor is set during manufacture in a manner that is free from being based upon measured chirp characteristics of a laser to be modulated by a laser driver that includes said dispersion compensation circuit.

17. The method of claim 15 where the bias of the varactor is capable of being tuned based upon the length of fiber to propagate a signal modulated by a laser driver that includes said dispersion compensation circuit.

18. The method of claim 15 where the bias of the varactor is capable of being tuned based upon the chirp characteristics of a laser to be modulated by a laser driver that includes said dispersion compensation circuit.

19. The method of claim 15 including adding the first attenuator attenuator to the input of said dispersion compensation circuit and adding the second attenuator to the output of said dispersion compensation circuit.

20. The method of claim 19 where the respective attenuations provided by said first and second attenuators are based on at least one of: (i) the chirp characteristics of a laser to be modulated by said laser driver that includes said dispersion compensation circuit; or (ii) a length of fiber to propagate a signal modulated by said laser driver.

* * * * *